United States Patent [19]

Hattori et al.

[11] 4,360,353
[45] Nov. 23, 1982

[54] POWER TRANSMISSION SYSTEM

[75] Inventors: Yoshiyuki Hattori, Toyoake; Kazuma Matsui, Toyohashi; Hiroji Kinbara, Aichi, all of Japan

[73] Assignee: Nippondenso Co., Ltd., Kariya, Japan

[21] Appl. No.: 140,594

[22] Filed: Apr. 15, 1980

[30] Foreign Application Priority Data

Aug. 28, 1979 [JP] Japan .................. 54-109511

[51] Int. Cl.³ ............................. F16H 55/52
[52] U.S. Cl. ..................... 474/12; 474/15; 474/19; 474/46
[58] Field of Search ............ 474/12, 15, 19, 21, 474/46, 13, 43, 45, 11, 14, 17, 20

[56] References Cited

U.S. PATENT DOCUMENTS

| | | | |
|---|---|---|---|
| 2,173,661 | 9/1939 | Perrine | 474/12 X |
| 3,362,242 | 1/1968 | Watkins | 474/15 |
| 3,492,884 | 2/1970 | Beaudoin | 474/13 |
| 3,599,504 | 8/1971 | Taylor | 474/12 |
| 3,659,470 | 5/1972 | Beaudoin | 474/13 |
| 3,908,475 | 9/1975 | Takagi et al. | 474/12 |
| 4,216,678 | 8/1980 | Butterfield et al. | 474/12 |

FOREIGN PATENT DOCUMENTS 1147208 11/1957 France .................. 474/15
1148087 12/1957 France .................. 474/15

Primary Examiner—Lawrence J. Staab
Attorney, Agent, or Firm—Cushman, Darby & Cushman

[57] ABSTRACT

A torque transmission system has driving and driven pulley units drivingly connected by an endless V-belt. Each of the driving and driven pulley units includes a stationary pulley rotatable with a shaft and a movable pulley disposed to define with the stationary pulley a circumferential continuous groove for receiving the V-belt. The movable pulleys of the driving and driven pulley units are axially resiliently biased so that the radii of the circles along which the V-belt engages the driving and driven pulley units are varied to change the speed-change ratio of the transmission system. The movable pulley of the driven pulley unit is axially shifted by fly weights. The driving and driven pulley units are provided with cam mechanisms each comprising a cam member and a follower member. When the load on the driven pulley unit is suddenly varied, the cam mechanisms are operative to keep constant the rotational speed of the driven pulley unit irrespective of variations in the load on the driven pulley unit.

5 Claims, 6 Drawing Figures

4,360,353

POWER TRANSMISSION SYSTEM

BACKGROUND OF THE INVENTION

The present invention relates to a torque transmission system of the type which utilizes driving and driven pulley units and an endless V-belt to transmit the torque of a shaft to another shaft. The transmission system of the present invention can be used, for example, to transmit the torque of an automotive engine to an auxiliary rotary equipment or device, such as air pump, water pump, fan, compressor, alternator, etc.

SUMMARY OF THE INVENTION

It is a primary object of the present invention to provide a torque transmission system which is operative to maintain a driven shaft at a substantially constant rotational speed while the rotational speed of a driving shaft is within a predetermined range and which is also operative to absorb variations in load torque.

The transmission system according to the present invention comprises a driving pulley unit provided on a driving shaft, a driven pulley unit provided on a driven shaft and an endless V-belt extending around the driving and driven pulley units. The driving pulley unit includes a first stationary pulley rotatable with the driving shaft, a first movable pulley disposed in opposite relationship to the first stationary pulley to cooperate therewith to define a first circumferentially continuous groove for receiving the V-belt, the first movable pulley being movable axially of the driving shaft toward and away from the first stationary pulley, and a first spring means resiliently biasing the first movable pulley in a direction to decrease the width of the first groove. The driven pulley unit includes a second stationary pulley rotatable with the driven shaft, a second movable pulley disposed in opposite relationship to the second stationary pulley to cooperate therewith to define a second circumferentially continuous groove for receiving the V-belt, the second movable pulley being movable axially of the driven shaft toward and away from the second stationary pulley, a second spring means resiliently biasing the second movable pulley in a direction to increase the width of the second groove, and fly weights operative to move the second movable pulley in a direction to decrease the width of the second groove by the centrifugal forces produced when the driven pulley unit is rotated. The torque transmission system of the present invention further includes a first and second cam mechanisms. The first cam mechanism is operative to decrease the width of the first groove in accordance with the magnitude of the load torque whereas the second cam mechanism is operative to increase the width of the second groove in accordance with the magnitude of the load troque.

The above and other objects, features and advantages of the present invention will be made more apparent by the following description with reference to the accompanying drawings.

DESCRIPTION OF A PREFERRED EMBODIMENT

Figure 1:
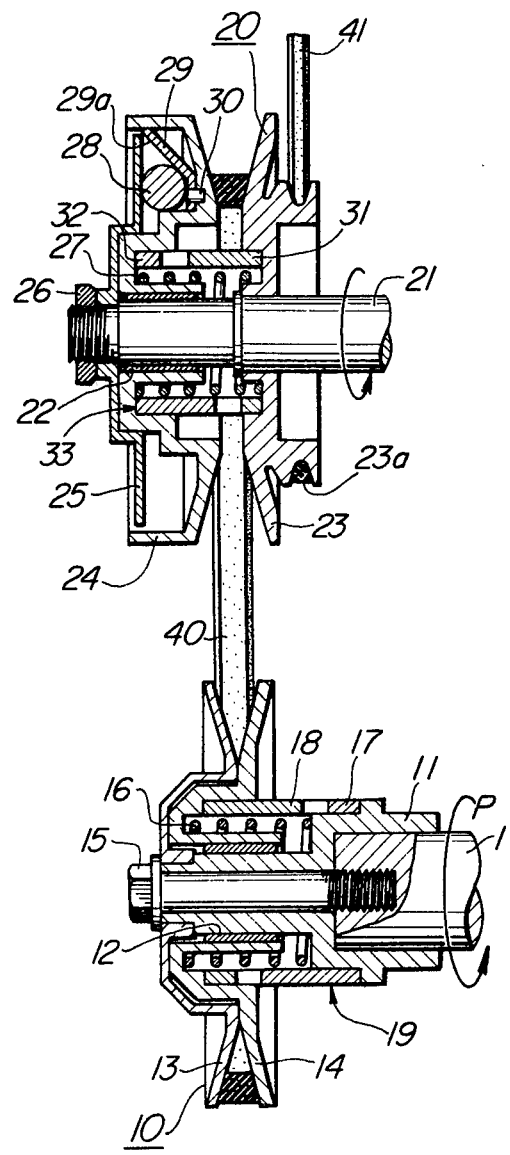
FIG. 1 is a longitudinal sectional view of a preferred embodiment of a power transmission system in accordance with the present invention.

Referring first to FIG. 1, reference numeral 1 denotes a drive shaft which, in the illustrated embodiment of the invention, is a crank shaft of an automotive engine rotated in a direction indicated by an arrow P. A main shaft 11 is fixedly secured to the drive shaft 1 by means of a bolt 15 and a key (not shown).

Numeral 12 denotes a dry bearing fitted into a movable pulley 14 and slidable on the shaft 11 together with the movable pulley 14. A stationary pulley 13 is fixedly secured to the main shaft 11 by means of the bolt 15 and a key (not shown). The stationary and movable pulleys 13 and 14 constitute a driving pulley unit 10. Thus, the width of the groove formed between the pulleys 13 and 14 of the driving pulley unit 10 is variable to vary the effective diameter of the driving pulley 10. The initial setting load on the driving pulley unit 10 is provided by a spring 16 which is operative to resiliently urge the movable pulley 14 toward the stationary pulley 13 for thereby decreasing the width of the groove in the driving pulley 10.

Figure 2:
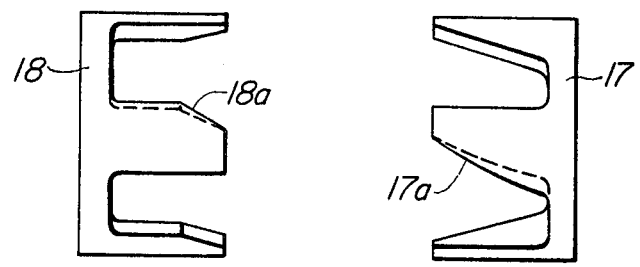
FIG. 2 is an exploded view of a cam mechanism for a driving pulley unit.
Figure 3:
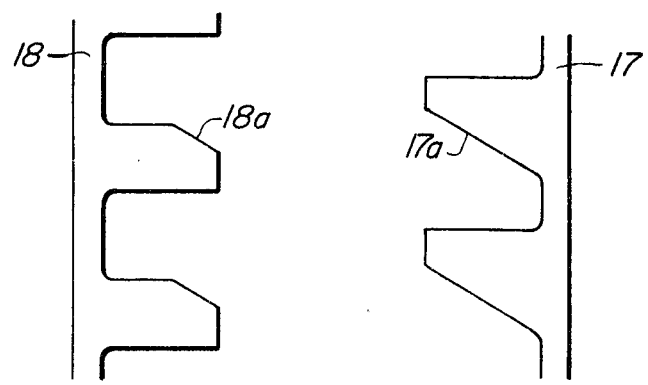
FIG. 3 is a developed view of the cam mechanism shown in FIG. 2.

Reference numeral 17 denotes a stationary cam fixed to the main shaft 11 and provided with cam surfaces 17a as best seen in FIG. 2. Each cam surface 17a extends at a predetermined angle and is substantially rectilineal as best seen in FIG. 3. A movable cam 18 is fixed to the movable pulley 14 and provided with cam surfaces 18a of substantially the same angle as that of each cam surface 17a, as will be seen in FIGS. 2 and 3. The stationary and movable cams 17 and 18 constitute a cam mechanism 19 for the driving pulley unit 10. The cam mechanism 19 is arranged such that the cam surface 17a and 18a are always in engagement with each other and, when a relative movement is produced between the stationary and movable cams 17 and 18, a force is exerted to the cam surface 17a and 18a in dependence on the angles of the cam surfaces 17a and 18a and on the torque load on the cam mechanism 19. Accordingly, the cams 17 and 18 must be durable and resistant to wear. According to a preferred embodiment of the present invention, therefore, the cams 17 and 18 are made of a carbon steel and cemented and hardened. The cams 17 and 18 may alternatively be made of aluminium and subjected to anode oxidation treatment so that their surfaces may become porous and impregnated with Teflon (trade name) whereby the surface hardness and the wear-resistant propety can be improved. Further alternatively, the cams 17 and 18 may be made of a steel and the cam surfaces 17a and 18a may be covered with layers of carbon fiber.

Reference numeral 21 denotes a driven shaft rotatably supported on an engine block (not shown) by means of a bearing (not shown). A dry bearing 22 is fitted into a movable pulley 24 and is slidable on the driven shaft 21 together with the movable pulley 24 as in the case of the driving pulley unit 10. A stationary pulley 23 is fixed to the driven shaft 21 by means of a key (not shown) and provided with a V-shaped groove 23a so that the torque can be transmitted through a V-belt 41 to an auxiliary equipment (not shown) of the automobile, such as air pump, water pump, fan, compressor, alternator or the like. In the illustrated embodiment of the invention, a single groove 23a is formed in the pulley 23, but it is to be noted that a plurality of grooves may be formed in the pulley. The stationary and movable pulleys 23 and 24 constitute a driven pulley unit 20. This driven pulley unit 20 is also arranged such that the width of the groove formed between the pulleys 23 and 24 is variable to vary the effective diameter of the driven pulley unit 20, as in the case of the driving pulley unit 10. A spring 27 exerts the initial setting force to the movable pulley 24 to resiliently bias this pulley away from the stationary pulley 23 for thereby tending to increase the width of the groove between the stationary and movable pulleys 23 and 24.

Six fly weights in the form of rollers (one of which is shown by 28) are provided for the movable pulley 24. Each fly weight 28 is disposed within a space defined between a holder 29 having an inclined surface 29a and a stationary plate 25 which is secured to the driven shaft 21 by means of a nut 26. The holder 29 is secured to the movable pulley 24 by means of a pin 30. The fly weights 28 revolve in unison with the movable pulley 24 to axially urge the associated holders 29 due to the centrifugal forces produced by the revolution of the fly weights 28. Thus, each of the fly weights 28 must be of a predetermined weight. In addition, the coefficient of friction between the fly weights 28 and the holders 29 should be minimized and they must be durable and resistant to wear. According to the present invention, therefore, the fly weights 28 are made of a steel and covered with layers of carbon fiber.

More specifically, a sheet of carbon filament fabric, which is coated with epoxy resin and has a thickness of from 0.1 to 0.2 mm, is wound around each fly weight 28 to form about four layers thereon so that the angle defined between the carbon filaments and the axis of the fly weight 28 is substantially 45° and the filaments intersect each other at right angles. The layers on the fly weight 28 are then subjected to heating and compression processes to melt the epoxy resin to thereby bond the carbon filaments onto the fly weight 28.

A stationary cam 31 is fixedly secured to the stationary pulley 23 and provided with cam surfaces 31a of rectilineal shapes and predetermined angles (FIG. 4) as in the case of the stationary cam 17 of the driving pulley unit 10. Each cam surface 31a of the cam 31 extends in the direction opposite to the direction of each cam surface 17a of the stationary cam 17 of the driving pulley unit 10. A movable cam 32 is secured to the movable pulley 24 and provided with cam surfaces 32a each having substantially the same angle as that of each cam surface 31a. The stationary and movable cams 31 and 32 constitute a cam mechanism 33 for the driven pulley unit 20 and are made of materials which are durable and highly wear-resistant, as in the case of the cams 17 and 18 of the driving pulley unit 10.

Reference numeral 40 denotes a V-belt extending around the driving and driven pulley units 10 and 20 to drivingly connect them. This V-belt 40 is formed principally of rubber with a reinforcement material embedded therein.

The operation of the power transmission system described above will be explained hereunder.

As the engine speed is increased from the idle speed, the rotational speeds of the driving and driven pulley units 10 and 20 are increased to increase the centrifugal forces acting on the fly weights 28, with a result that the force component acting on the inclined surfaces 29a of the holders 29 tends to urge the movable pulley 24 toward the stationary pulley 23. However, so long as this force component does not exceed a force which is in proportion to the sum of the forces of the springs 16 and 27, the movable pulley 24 is not axially displaced, so that the torque is transmitted at a predetermined constant transmission ratio. Namely, the speed of the driven pulley unit 20 will be increased as indicated by a line O-a shown in FIG. 5.

In this case, due to the initial setting loads of the springs 16 and 27, the width of the groove in the driving pulley unit 10 is maintained minimum while the width of the groove in the driven pulley unit 20 is maintained maximum. Thus, the circle along which the V-belt 40 engages the driving pulley unit 10 is radially outwardly spaced from the driving shaft 1 while the circle along which the belt 40 engages the driven pulley unit 20 is close to the driven shaft 21. Thus, the rotational speed of the driven pulley unit 20 is higher than the rotational speed of the driving pulley unit 10. Accordingly, the rate of the increase in the rotational speed of the driven pulley unit 20 is greater than the rate of the increase in the rotational speed of the engine and thus of the driving pulley unit 10.

When the force component of the centrifugal forces of the fly weights 28 tending to urge the movable pulley 24 toward the stationary pulley 23 exceeds the sum of the forces of the springs 16 and 27, the movable pulley 24 is axially displaced toward the stationary pulley 23 with a result that the width of the groove in the driven pulley unit 20 is decreased with a resultant increase in the radius of the circle along which the belt 40 engages the driven pulley unit 20. Accordingly, the radius of the circle along which the belt 40 engages the driving pulley unit 10 is decreased, so that the movable pulley 14 of the driving pulley unit 10 is axially moved to increase the width of the groove in the driving pulley unit 10.

Figure 5:
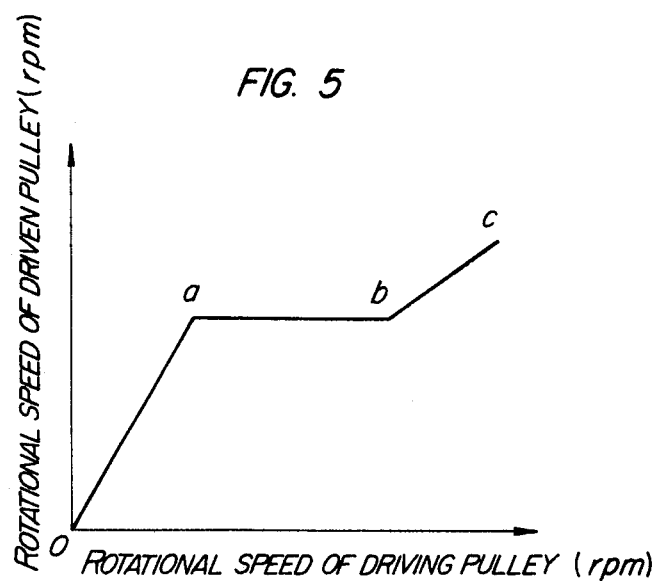
FIG. 5 shows a graph or characteristic curve diagrammatically illustrating the operation characteristic of the power transmission system shown in FIG. 1.

As such, the radii of the circles along which the belt 40 engages the driving and driven pulley units 10 and 20 are varied so that the rotational speed of the driven pulley unit 20 is kept constant irrespective of the variation in the rotational speed of the driving pulley unit 10, as shown by line a-b in FIG. 5.

In the described constant speed range, the widths of the grooves in the driving and driven pulley units 10 and 20 depend upon the balance between the centrifugal forces of the fly weights and the sum of the forces of the springs 16 and 27. Thus, when the load of the automotive equipment to be driven by the driven pulley unit 20 through the belt 41 is suddenly varied; that is, when a compressor, for example, is started, the load on the driven pulley unit 20 is abruptly varied to change the width of the groove in the driven pulley unit 20 and hence change the width of the groove in the driving pulley unit 10, with a result that the belt 40 is unduely slackened or tensioned. Thus, the driven pulley unit 20 may not be driven at a proper speed. In addition, the durability of the belt 40 will be considerably lowered.

With the power transmission system according to the present invention, however, the cam mechanisms 19 and 33 for the driving and driven pulley units 10 and 20 are operative to maintain constant groove widths of the driving and driven pulley units 10 and 20, so that the shortcomings of the prior art discussed above are eliminated.

Figure 4:
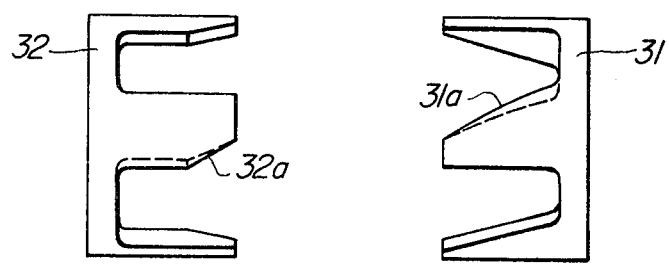
FIG. 4 is an exploded view of a cam mechanism for a driven pulley unit.

More specifically, when the load of the auxiliary equipment being driven by the belt 41 is suddenly increased producing a force which tends to stop the rotation of the stationary pulley 23 of the driven pulley unit 20 and thus produce a torsional moment between the stationary and movable pulleys 23 and 24, a force corresponding to the torsional moments acts on the cam surfaces 31a and 32a of the stationary and movable cams 31 and 32 of the cam mechanism 33 provided for the driven pulley unit 20. Since the cam surfaces 31a and 32a are inclined relative to the circumferential direction of the driven shaft 21, as shown in FIG. 4, the force on the cam surfaces 31a and 32a adds to the biasing force of the spring 27 to increase the width of the groove in the driven pulley unit 20.

Similarly, when the abrupt increase in the load of the auxiliary equipment is transmitted through the belt 40 to the driving pulley unit 10, a torsional moment is produced between the stationary and movable pulleys 13 and 14, so that a corresponding force is applied to the cam mechanism 19. Since the cam surfaces 17a and 18a of the cam mechanism 19 are inclined in the direction opposite to the direction of inclination of the cam surfaces of the cam mechanism 33, the force on the cam surfaces 17a and 18a adds to the force of the spring 16 to decrease the width of the groove in the driving pulley unit 10.

As described, when the load of the auxiliary equipment is suddenly increased, the increased load is effective to cause the cam mechanisms 19 and 33 of the driving and driven pulley units 10 and 20 to add to the forces of the springs 16 and 27, so that the variation in the rotational speed of the driven pulley unit 20 due to the sudden change of the load in minimized. This means that the initial setting loads on the cam mechanisms 19 and 33 can be the minimum necessary values determined on the basis of an assumption that no load is applied by the auxiliary equipment to be driven. Accordingly, the power transmission system of the present invention in its entirety can be made very compact in size because the springs 16 and 27 can be small-sized. In addition, the mounting and dismounting of the system can be considerably simplified.

Figure 6:
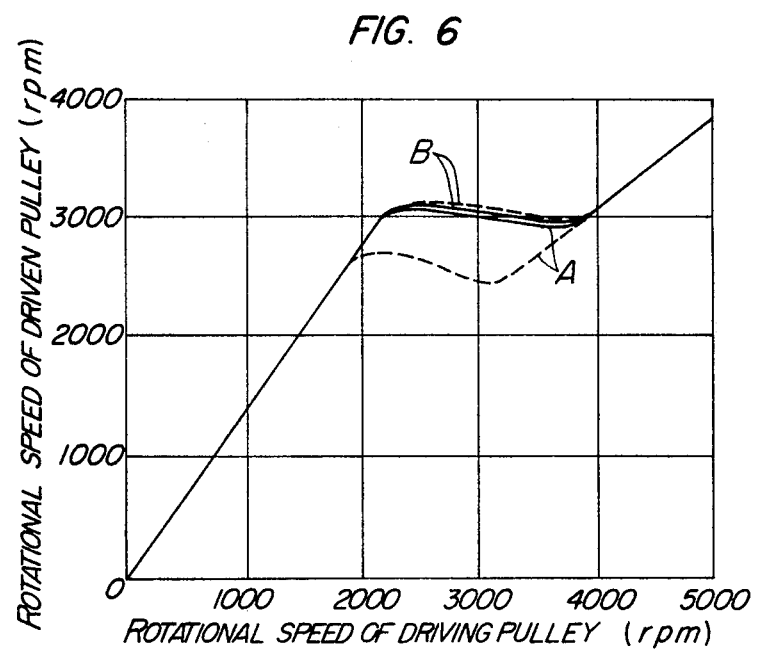
FIG. 6 diagraphically illustrates the operational characteristics of the power transmission system of the present invention and of a prior art power transmission system.

FIG. 6 graphically illustrates (by solid line curve) the variation in the rotational speed of the driven pulley unit 20 of the system of the present invention provided with the cam mechanisms 19 and 33 due to the change of the load and also illustrates by broken line curve a similar variation in the rotational speed of a driven pulley unit of a similar system which is not provided with any cam mechanism but includes springs (16, 27) of increased initial setting loads. It will be seen also from FIG. 6 that the system of the present invention provides an improved operation when the rotational speed of driving pulley is increased (indicated by B) and also when the rotational speed of driving pulley is decreased (indicated by A).

As the engine speed is increased further, the width of the groove in the driving pulley unit 10 becomes the maximum while the width of the groove in the driven pulley unit 20 becomes the minimum. After this condition is attained, the rotational speed of the driven pulley unit 20 is increased in accordance with the increase in the engine speed and thus in the speed of the driving pulley unit 10, as shown by line b-c in FIG. 5. In this case, however, the radius of the circle along which the belt 40 engages the driving pulley unit 10 is smaller than that of the circle along which the belt 40 engages the driven pulley unit 20. Thus, the torque is transmitted from the driving to the driven pulley unit at a predetermined speed reduction ratio.

The scope of the present invention is not limited to the described and illustrated embodiment of the invention. For example, the cam mechanisms 19 and 33 and the fly weights 28 have been described as being made of highly self-lubricating materials, but it will be apparent to those in the art that they can alternatively be positively lubricated by lubricant such as grease.

The power transmission system of the invention has been described as being disposed between an automotive engine and an auxiliary rotary device to transmit torque therebetween. However, it will be needless to say that the system of the invention can also be used for another purpose. In addition, in the case where a single rotary machine is to be connected to the driven pulley unit 20, the V-belt groove 23a can be eliminated and, instead, the rotary machine can be directly connected to the driven shaft 21.

As described, since each of the driving and driven pulley units of the system of the invention includes stationary and movable pulleys and a spring and since the driven pulley unit is provided with fly weights, the rotational speed of the driven pulley unit can be always kept constant within a predetermined rotational speed range of the driving pulley unit and irrespective of the variation in the speed thereof. Especially due to the provision of the fly weights in the driven pulley unit, the speed of the driven pulley unit can be controlled in an closed loop control mode. Thus, the rotational speed of the driven pulley unit can be controlled to a high degree of accuracy without a fine adjustment of the balance between the centrifugal forces generated by the fly weights and the initial loads applied by the springs.

In addition, because the driving and driven pulley units of the system of the invention are both provided with cam mechanisms which are operative to add to the spring forces when the driven pulley unit is subjected to variations in the load, the rotational speed of the driven pulley unit of the system can be always kept constant irrespective of variations in the load on the driven pulley unit.

What is claimed is:

1. A power transmission system for transmitting torque of a driving shaft to a driven shaft, said system comprising:
a driving pulley unit provided on said driving shaft;
a driven pulley unit provided on said driven shaft;
an endless V-belt extending around said driving and driven pulley units;
said driving pulley unit including a first stationary pulley rotatable with said driving shaft, a first movable pulley disposed in opposite relationship to said first stationary pulley to cooperate therewith to define a first circumferentially continuous groove for receiving said V-belt, said first movable pulley being movable axially of said driving shaft toward and away from said first stationary pulley, and a first spring means resiliently biasing said first movable pulley in a direction to decrease the width of said first grove;
said driven pulley unit including a second stationary pulley rotatable with said driven shaft, a second movable pulley disposed in opposite relationship to said second stationary pulley to cooperate therewith to define a second circumferentially continuous groove for receiving said V-belt, said second movable pulley being movable axially of said driven shaft toward and away from said second stationary pulley, a second spring means resiliently biasing said second movable pulley in a direction to increase the width of said second groove, fly weights operative to move said second movable pulley in a direction to decrease the width of said second groove by the centrifugal forces produced when said driven pulley unit is rotated, and guide means fixed to said driven shaft for guiding said fly weights;

a first cam mechanism operative to decrease the width of said first groove in accordance with the magnitude of the load torque; and a second cam mechanism operative to increase the width of said second groove in accordance with the magnitude of the load torque;

said first cam mechanism including a first cam member and a first follower member, one of said cam member and follower member being fixed to said first stationary pulley and the other being fixed to said first movable pulley for axial movement therewith;

said second cam mechanism including a second cam member and a second follower member, one of said second cam member and second follower member being fixed to said second stationary pulley and the other being fixed to said second movable pulley for axial movement therewith;

said first cam member having at least one cam surface;

said second cam member having at least one cam surface;

the cam surfaces of said cam members being inclined with respect to the axes of said driving and driven pulley units, respectively, and extending substantially in the opposite directions.

2. A power transmission system as defined in claim 1, wherein said first and second follower members have surfaces inclined with respect to the axes of said driving and driven pulley units, respectively, said inclined surfaces being in slidable engagement with said cam surfaces of said first and second cam members, respectively.

3. A power transmission system as defined in claim 2, wherein said second movable pulley provides abutment surfaces inclined to a plane normal to the axis of said driven pulley unit and each of said fly weights has its peripheral surface in engagement with one of said inclined abutment surfaces.

4. A power transmission system as defined in claim 2 or 3, wherein at least the cam surface of each of said first and second cam mechanisms and the peripheral surfaces of said fly weights are coated with layers of a self-lubrication material.

5. A power transmission system for transmitting torque of a driving shaft to a driven shaft, said system comprising:

a driving pulley unit provided on said driving shaft;

a driven pulley unit provided on said driven shaft;

an endless V-belt extending around said driving and driven pulley units;

said driving pulley unit including a first stationary pulley rotatable with said driving shaft, a first movable pulley disposed in opposite relationship to said first stationary pulley to cooperate therewith to define a first circumferentially continuous groove for receiving said V-belt, said first movable pulley being movable axially of said driving shaft toward and away from said first stationary pulley, and a first spring means resiliently biasing said first movable pulley in a direction to decrease the width of said first groove;

said driven pulley unit including a second stationary pulley rotatable with said driven shaft, a second movable pulley disposed in opposite relationship to said second stationary pulley to cooperate therewith to define a second circumferentially continuous groove for receiving said V-belt, said second movable pulley being movable axially of said driven shaft toward and away from said second stationary pulley, a second spring means resiliently biasing said second movable pulley in a direction to increase the width of said second groove, fly weights operative to move said second movable pulley in a direction to decrease the width of said second groove by the centrifugal forces produced when said driven pulley unit is rotated, and guide means fixed to said driven shaft for guiding said fly weights;

a first cam mechanism operative to decrease the width of said first groove in accordance with the magnitude of the load torque; and a second cam mechanism operative to increase the width of said second groove in accordance with the magnitude of the load torque.

* * * * *